United States Patent [19]
Su

[11] Patent Number: 6,001,313
[45] Date of Patent: Dec. 14, 1999

[54] STACK DEVICE CAPABLE OF REMOVING DUST PARTICLES, SULFUR OXIDES AND NITROGEN OXIDES

[75] Inventor: Wen-Shen Su, Chang-Hua, Taiwan

[73] Assignee: Tai-Tien Anti Air Pollution Co., Ltd., Taiwan

[21] Appl. No.: 09/036,302

[22] Filed: Mar. 6, 1998

[51] Int. Cl.⁶ .................................................. B01D 53/34
[52] U.S. Cl. .......................... 422/168; 422/169; 422/170; 422/172; 96/236; 96/267
[58] Field of Search ..................... 422/168–172, 422/189; 96/236, 267; 423/242.2, 243.01, 215.5, 235

[56] References Cited

U.S. PATENT DOCUMENTS 4,295,865 10/1981 Su ............................................ 55/435
5,595,713 1/1997 Gohara et al. .......................... 422/170

Primary Examiner—Hien Tran
Attorney, Agent, or Firm—Ostronlenk, Faber, Gerb & Soffen, LLP

[57] ABSTRACT

A pollutant removing stack device includes a stack body having a lower reactor section which is divided by a partition into an upper chamber and a lower chamber. A first set of spraying units is disposed in the lower chamber. A second set of spraying units is disposed the upper chamber. A stack gas inlet is connected to the lower chamber of the lower reactor section for entrance of a stack gas. An oxidant supplying unit is connected to the first set of spraying units in order to produce an oxidant mist in the lower chamber for oxidizing a nitrogen compound contained in the stack gas into nitrogen dioxide. An alkaline solution supplying unit is connected to the second set of spraying units in order to produce an alkaline mist in the upper chamber for removing nitrogen dioxide and sulfur dioxide from the stack gas.

11 Claims, 2 Drawing Sheets

STACK DEVICE CAPABLE OF REMOVING DUST PARTICLES, SULFUR OXIDES AND NITROGEN OXIDES

BACKGROUND OF THE INVENTION

1. Field of the Invention

This invention relates to a stack device, more particularly to a stack device capable of removing dust particles, sulfur oxides and nitrogen oxides from a stack gas.

2. Description of the Related Art

In the prior art, a conventional stack device includes an apparatus for removing dust and sulfur oxides of a stack gas, and a stack gas passage through which the stack gas passes. The apparatus has a plurality of first spraying units with first nozzles which spray an aqueous alkaline solution toward the central axis of the stack device in order to produce an alkaline mist. The first spraying units are mounted at the intermediate section of the passage of the stack device. A mist extractor is provided in the passage near the top of the stack device. A second spraying unit is mounted below the mist extractor. The second spraying unit has a plurality of second spray nozzles which spray the aqueous alkaline solution downward in order to produce an alkaline mist below the mist extractor. Dust and sulfur oxides contained in the stack gas adhere to the condensed drops of the alkaline mist and are removed from the stack gas. Waste, consisting essentially of alkaline solution, dust and sulfur oxides, is collected in a settling tank. However, it is noted that the alkaline mist in the stack device cannot remove nitrogen oxides contained in the stack gas. In addition, water in the waste collected in the settling tank is not reused.

SUMMARY OF THE INVENTION

An object of the present invention is to provide a pollutant removing stack device that can remove dust, sulfur oxides and nitrogen oxides from a stack gas.

Another object of the present invention is to provide a pollutant removing stack device in which water in the waste can be reused effectively.

According to the present invention, the pollutant removing stack device comprises:

a stack body having an upper discharge section and a lower reactor section with a bottom;

a partition disposed in the lower reactor section in order to divide the lower reactor section into an upper chamber and a lower chamber, the partition having a through hole formed therein to communicate the upper and lower chambers, the lower chamber having a first outlet adjacent to the bottom of the lower reactor section and a first set of spraying units disposed therein, the upper chamber having a second outlet adjacent to the partition, a second set of spraying units disposed therein, and a mist extractor mounted stack gas inlet means connected to the lower chamber of the lower reactor section for entrance of a stack gas;

oxidant supplying means connected to the first set of spraying units in order to produce an oxidant mist in the lower chamber for oxidizing a nitrogen compound contained in the stack gas into nitrogen dioxide;

alkaline solution supplying means connected to the second set of spraying units in order to produce an alkaline mist in the upper chamber for removing nitrogen dioxide and sulfur dioxide from the stack gas;

a first settling tank communicated fluidly with the first outlet of the lower chamber for collecting waste from the lower chamber; and a second settling tank communicated fluidly with the second outlet of the upper chamber for collecting waste from the upper chamber.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENTS

Figure 1:
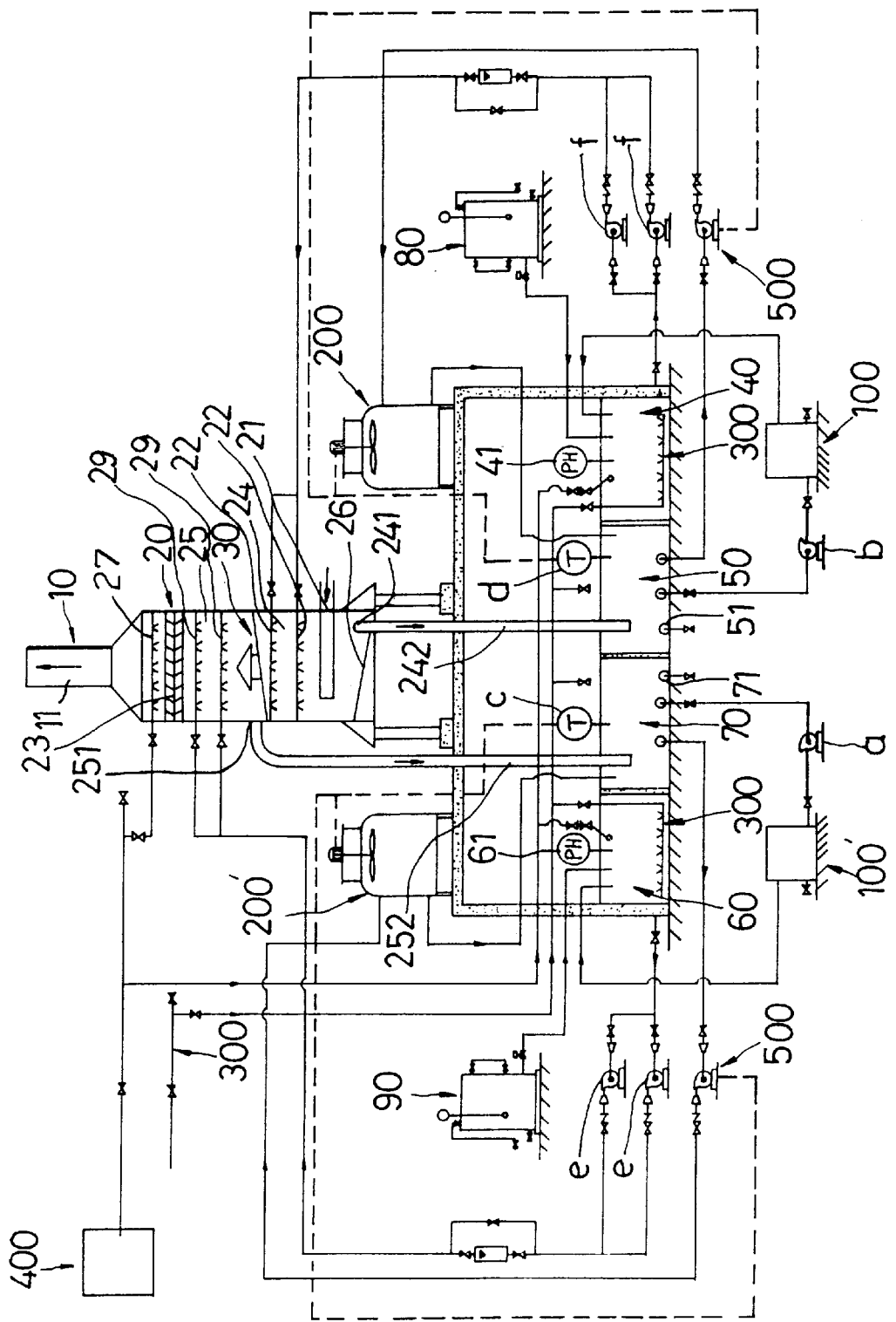
FIG. 1 is a schematic view illustrating a preferred embodiment of a pollutant removing stack device according to the present invention.
Figure 2:
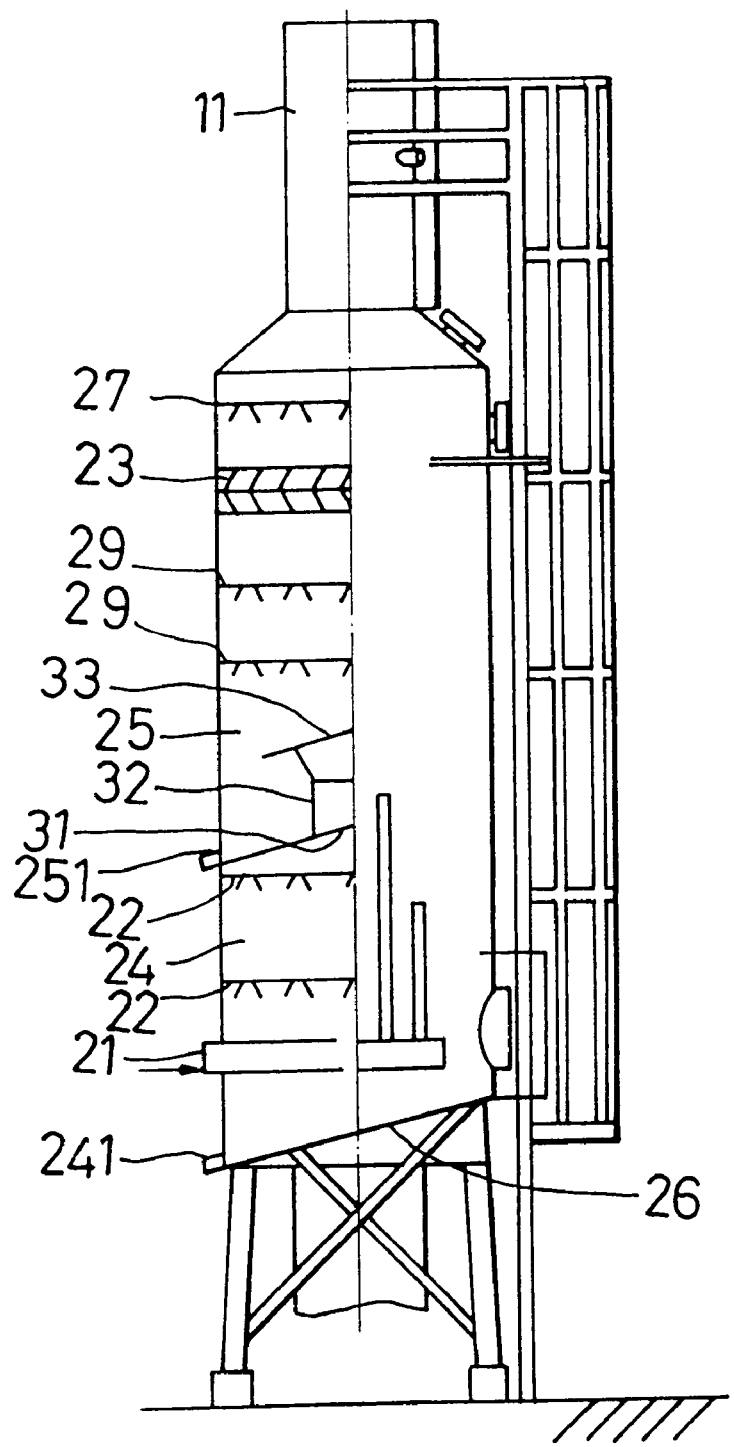
FIG. 2 is a schematic view illustrating the stack body of the pollutant removing stack device according to the present invention.

Referring to FIGS. 1 and 2, the preferred embodiment of a pollutant removing stack device according to the present invention is shown to comprise a stack body 10 which has an upper discharge section 11 and a lower reactor section 20. A partition 30 is disposed in the lower reactor section 20 in order to divide the lower reactor section 20 into an upper chamber 25 and a lower chamber 24. The partition 30 is inclined with respect to a horizontal plane passing transversely through the lower reactor section 24, and has a through hole 31 formed therein to communicate the upper and lower chambers 25, 24. The partition 30 has a cone-shaped cover member 33 supported spacedly over the through hole 31 by a hollow cylindrical member 32 for shielding the through hole 31. The lower reactor section 20 has a bottom 26 that is inclined with respect to the horizontal plane passing transversely through the lower reactor section 24. The lower chamber 24 has a first outlet 241 adjacent to the bottom 26 of the lower reactor section 20, and a first set of spraying units 22 disposed therein. The upper chamber 25 has a second outlet 251 adjacent to the partition 30, and a second set of spraying units 29 disposed therein. A mist extractor 23 is mounted above the second set of spraying units 29. The upper chamber 25 has a water spraying unit 27 mounted above the mist extractor 23. A stack gas inlet pipe 21 is connected to the lower chamber 24 of the lower reactor section 20 for entrance of a stack gas.

Oxidant supplying means is connected to the first set of spraying units 22. The oxidant supplying means has a concentrated oxidant source 80, and a first mixing tank 40 which is connected fluidly to the first set of spraying units 22, the oxidant source 80 and a main water source 400 by means of pipes. The concentrated oxidant from the source 80 and soft water from the main water source 400 are mixed in the mixing tank 40 to form an aqueous oxidant solution. The aqueous oxidant solution may be pumped to the lower chamber 24 via the first set of spraying units 22 by means of pumps (f) in order to produce an oxidant mist in the lower chamber 24. In this embodiment, the concentrated oxidant source is $NaClO_2$. However, $KMnO_4$ and $H_2O_2$ may be used. A PH value control device 41 is provided in the mixing tank 40 in order to control the PH value of the aqueous oxidant solution in the mixing tank 40 at a predetermined value.

Alkaline solution supplying means is connected to the second set of spraying units 29. The alkaline solution supplying means has a concentrated alkaline solution source 90, and a second mixing tank 60 which is connected fluidly to the second set of spraying units 29, the alkaline solution source 90 and the main water source 400 by means of pipes. The concentrated alkaline from the source 90 and the soft water from the main water source 400 are mixed in the mixing tank 60 to form an aqueous alkaline solution. The aqueous alkaline solution may be pumped to the upper chamber 25 via the second set of spraying units 29 by means of pumps (e) in order to produce an alkaline mist in the upper chamber 25. In this embodiment, the concentrated alkaline source is NaOH. However, $Ca(OH)_2$ and $Mg(OH)_2$ may be used. A PH value control device 61 is provided in the mixing tank 60 in order to control the PH value of the aqueous alkaline solution in the mixing tank 60 at a predetermined value. Each of the mixing tanks 40, 60 has compressed air injecting means 300 to serve as a mixer.

A first settling tank 50 is communicated fluidly with the first outlet 241 of the lower chamber 24 by a pipe 242. A first temperature sensor (d) is disposed in the first settling tank 50 for detecting the temperature of the liquid contained in the latter. A second settling tank 70 is communicated fluidly with the second outlet 251 of the upper chamber 25 by means of a pipe 252. A second temperature sensor (c) is disposed in the second settling tank 70 for detecting the temperature of the liquid contained in the latter.

A first filtration system 100 is disposed downstream of the first settling tank 50 and upstream of the first mixing tank 40. A second filtration system 100' is disposed downstream of the second settling tank 70 and upstream of the second mixing tank 60. In this embodiment, each of the first and second filtration systems 100, 100' include a plate and frame filter press. A first cooling system 200 is communicated fluidly with the first settling tank 50. A second cooling system 200' is communicated fluidly with the second settling tank 70.

The operations and advantages of the pollutant removing stack device according to the present invention will now be described in the succeeding paragraphs.

When the stack gas flows into the lower chamber 24 of the stack body 10 from, for example, a boiler (not shown), via the stack gas inlet pipe 21, the oxidant mist in the lower chamber 24 will oxidize a nitrogen compound, such as nitrogen oxide (NO), contained in the stack gas into nitrogen dioxide ($NO_2$). The chemical reaction formula is as follow:

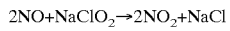
$$2NO+NaClO_2 \rightarrow 2NO_2+NaCl$$

The nitrogen dioxide and sulfur oxides contained in the stack gas will then flow upwardly into the upper chamber 25 through the through hole 31 in the partition 30. A part of $NaClO_2$ flows upwardly together with the stack gas containing nitrogen dioxide and sulfur oxides. The gas mixture is mixed and reacted with the alkaline mist in the upper chamber 25. The chemical reaction formulas are as follows:

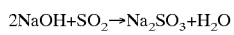
$$2NaOH+SO_2 \rightarrow Na_2SO_3+H_2O$$

$$Na_2SO_3+H_2O+SO_2 \rightarrow 2NaHSO_3$$

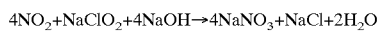
$$4NO_2+NaClO_2+4NaOH \rightarrow 4NaNO_3+NaCl+2H_2O$$

In addition, the dust particles in the stack gas adhere and are trapped by the oxidant and alkaline mists in the upper and lower chambers 25, 24. Waste liquids that contains dust, sulfur oxides and nitrogen oxides will condense and fall on the inclined bottom 26 of the lower reactor section 20 and the partition 30, and flow into the first and second settling tanks 50, 70 via the first and second outlets 241, 251, respectively. The mist extractor 23 and the water spraying unit 27 further facilitate trapping and condensing of the dust particles in the stack gas. The cone-shaped cover member 33 can prevent the waste liquid in the upper chamber 25 from flowing into the lower chamber 24 via the through hole 31 in the partition 30. Therefore, the dusts, the nitrogen oxides and sulfur oxides contained in the stack gas can be effectively removed from the stack gas. It is found through an experiment that over 85% of dust particles, over 95% of sulfur oxides, and over 74% of nitrogen oxides can be removed from the stack gas.

The water liquids in the first and second settling tanks 50, 70 are pumped and recycled through the first and second cooling systems 200, 200' by means of pumps 500 for effecting heat transfer when the temperature of the water liquids in the first and second settling tanks 50, 70, which is detected by the temperature sensors (c, d), is greater than a predetermined value. Then, the cooled waste liquids in the first and second settling tanks 50, 70 are pumped respectively through the first and second filtration systems 100, 100' by means of pumps (a, b) to separate the solid material contained in the waste liquids from water which is, in turn, supplied to the first and second mixing tanks 40, 60 to serve as an addition water source. A first discharge valve 51 and a second discharge valve 71 are connected respectively to the bottoms of the first and second settling tanks 50, 70. The slurry containing dust particles, sulfur oxides and nitrogen oxides and settling on the bottoms of the first and second settling tanks 50, 70 may be discharged via the first and second discharge valves 51, 71 every three or four months.

The diameter of the upper section 11 is preferably smaller than that of the lower section 20, thereby resulting in an upper suction force in the stack body 10. This facilitates the rise of the stack gas.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:
1. A pollutant removing stack device, comprising:
    a stack body having an upper discharge section and a lower reactor section with a bottom;
    a partition disposed in said lower reactor section in order to divide said lower reactor section into an upper chamber and a lower chamber, said partition having a through hole formed therein to communicate said upper and lower chambers, said lower chamber having a first outlet adjacent to said bottom of said lower reactor section and a first set of spraying units disposed therein, said upper chamber having a second outlet adjacent to said partition, a second set of spraying units disposed therein, and a mist extractor mounted above said second set of spraying units;
    stack gas inlet means connected to said lower chamber of said lower reactor section for entrance of a stack gas;
    oxidant supplying means connected to said first set of spraying units in order to produce an oxidant mist in said lower chamber for oxidizing a nitrogen compound contained in said stack gas into nitrogen dioxide;
    alkaline solution supplying means connected to said second set of spraying units in order to produce an alkaline mist in said upper chamber for removing nitrogen dioxide and sulfur dioxide from said stack gas;
    a first settling tank communicated fluidly with said first outlet of said lower chamber for collecting waste from said lower chamber; and a second settling tank communicated fluidly with said second outlet of said upper chamber for collecting waste from said upper chamber.

2. The pollutant removing stack device as claimed in claim 1, wherein said oxidant supplying means has an oxidant source and a first mixing tank connected fluidly to said first set of spraying units, said oxidant source and a main water source, said alkaline solution supplying means having an alkaline solution source and a second mixing tank connected fluidly to said second set of spraying units, said alkaline solution source and said main water source.

3. The pollutant removing stack device as claimed in claim 2, further comprising a first filtration system disposed downstream of said first settling tank and upstream of said first mixing tank, and a second filtration system disposed downstream of said second settling tank and upstream of said second mixing tank.

4. The pollutant removing stack device as claimed in claim 2, further comprising a first cooling system communicated fluidly with said first settling tank, and a second cooling system communicated fluidly with said second settling tank.

5. The pollutant removing stack device as claimed in claim 1, wherein said oxidant supplying means contains an oxidant solution selected from the group consisting of $NaClO_2$, $KMnO_4$ and $H_2O_2$ solutions.

6. The pollutant removing stack device as claimed in claim 1, wherein said alkaline solution supplying means contains an alkaline solution selected from the group consisting of NaOH, $Ca(OH)_2$ and $Mg(OH)_2$ solutions.

7. The pollutant removing stack device as claimed in claim 1, wherein said upper chamber has a water spraying unit mounted above said mist extractor.

8. The pollutant removing stack device as claimed in claim 1, wherein said partition is inclined with respect to a horizontal plane passing transversely through said lower reactor section.

9. The pollutant removing stack device as claimed in claim 1, wherein said bottom of said lower reactor section is inclined with respect to a horizontal plane passing transversely through said lower reactor section.

10. The pollutant removing stack device as claimed in claim 2, wherein each of said first and second mixing tanks has a PH value controlling device and compressed air injecting means to serve as a mixer.

11. The pollutant removing stack device as claimed in claim 1, wherein said partition has a cover member supported spacedly over said through hole for shielding said through hole.

* * * * *